March 10, 1942.  C. S. BULL ET AL  2,276,152
THERMIONIC VALVE VOLTMETER AND POTENTIOMETER CIRCUITS AND THE LIKE
Filed Nov. 16, 1938

INVENTOR
CABOT SEATON BULL
ALAN DOWER BLUMLEIN
BY H. S. Grover
ATTORNEY

Patented Mar. 10, 1942

2,276,152

UNITED STATES PATENT OFFICE 2,276,152

THERMIONIC VALVE VOLTMETER AND POTENTIOMETER CIRCUITS AND THE LIKE

Cabot Seaton Bull, Hillingdon, and Alan Dower Blumlein, Ealing, London, England, assignors to Electric & Musical Industries Limited, Hayes, England, a company of Great Britain Application November 16, 1938, Serial No. 240,736 In Great Britain November 18, 1937

8 Claims. (Cl. 171—95)

The present invention relates generally to thermionic tube circuits, and more particularly to such circuits as are used for measuring high voltages by producing low voltage waves corresponding in form to the high voltage waves, for example for monitoring or measuring purposes, and the invention also includes the provision of a thermionic tube suitable for use in such circuits.

An important object of the present invention is to provide an arrangement for measuring high voltages without drawing excessive power from the voltage source on the one hand or requiring expensive and delicate instruments for measuring very small currents, on the other hand.

Another object of the invention is to provide a tube voltmeter arrangement which has a wide range of operation and may be used to measure direct current voltages, and mean or peak values of high frequency alternating current voltages.

When a simple resistance potentiometer is used for obtaining a low voltage which is a given fraction of the total voltage applied across the potentiometer, the total potentiometer resisance must be extremely high if the power dissipated therein is to be kept low. On the other hand, this means that the current flowing is extremely small and therefore a sensitive and expensive instrument must be employed for measuring the current in the potentiometer or the voltage across a portion thereof.

In accordance with the present invention, a vacuum tube is used as one portion of the potentiometer and a resistance as the other portion. The voltage developed across the resistance may be measured by means of a sensitive instrument but preferably, in further accordance with the invention, a second vacuum tube is employed as a current multiplier so that a more rugged and less expensive measuring instrument may be used. The invention will, however, be better understood by reference to the accompanying drawing wherein Figure 1 shows the potentiometer arrangement;

Figure 1:
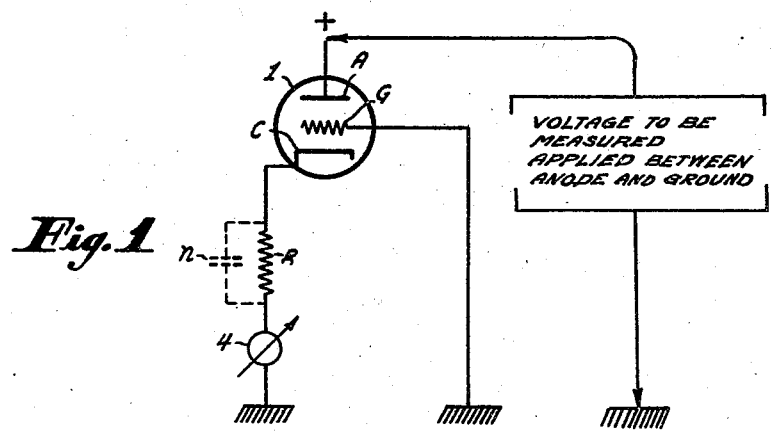

Referring to Figure 1 there is shown a potentiometer comprising the discharge path between anode A and cathode C of tube I connected in series with resistance R. A meter 4 is also connected to read the current through R from which current the voltage drop across R my be inferred. It is, of course, alternatively possible to connect a high resistance voltmeter across R. When an unknown high voltage is connected between anode A and ground as indicated by the plus sign, the potential of cathode C will rise to a value which is a fraction of the total voltage applied, this fraction being substantially determined by the geometry of the tube elements and substantially independent of the cathode emission of the tube and of the exact resistance at R, provided that R is sufficiently high. This result may be proved mathematically but may also be readily seen from the following considerations:

Since R is assumed to be very large, the current flowing through the tube and R in series must be very small. But a high voltage is impressed upon the anode and therefore the tube current can only be small provided that the cathode is more positive than the grid by an amount which is almost sufficient to cut off the space current of the tube. Since the grid is connected to ground what happens then is that the cathode potential will rise and approach but not quite reach the potential required for complete cut off. The potential required for complete cut off is, as is well known, determined solely by the amplification constant of the tube, that is, by its geometry, and is independent of the emission from the cathode, and also of the resistance used at R.

If the amplification constant is made high, the potential of the cathode will be a small fraction of the total voltage impressed on the anode and therefore the problem of measuring the original high voltage is transformed into the measurement of a relatively low voltage.

Figure 3:
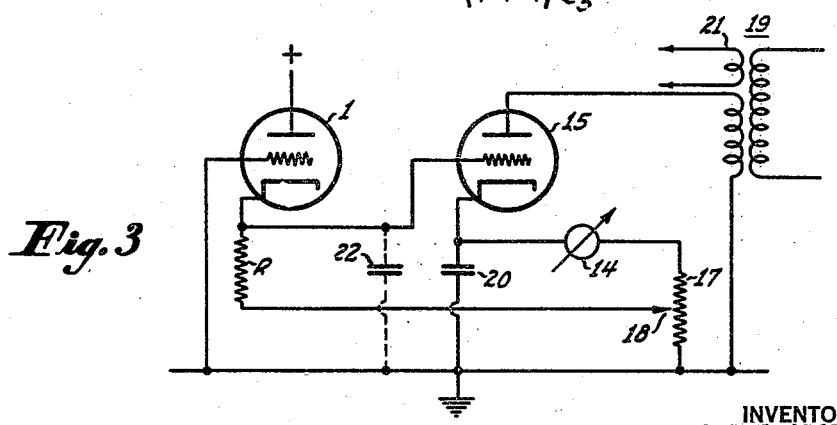
Figure 3 shows the potentiometer connected to a current multiplying tube.

However, a direct measurement of the voltage across high resistance R requires an expensive instrument and therefore a suitable type of vacuum tube voltmeter is preferably connected across R, such as is shown in Figure 3. In Figure 3 tube I is again the potentiometer tube and R the resistance across which the fractional voltage appears. The lower end of R is connected to a slider 18 but for the moment let us consider this slider to be at ground potential. In this case it will be seen that tube 15 has its grid connected to the cathode of tube I and that the voltage across R is impressed between ground and the grid of tube 15. A resistance 17 is connected between the cathode of tube 15 and ground and a source of plate current is connected between the plate of tube 15 and ground. This source of plate current is indicated at 19 as a transformer but for the sake of preliminary explanation it will be assumed that a battery is substituted for transformer 19 with its negative end connected to ground and its positive end to the anode of tube 15. With the assumptions just enumerated, it is well known that any change in the potential of the grid of tube 15 will cause a substantially equal change in the potential of the cathode of this tube provided that the resistance of 17 is large compared to the reciprocal of the transconductance of the tube. A tube operated in this manner is known as a "cathode follower" tube.

Since the transconductance of a triode may easily exceed several thousand micromhos this condition may be satisfied by a value of considerably less than one hundred thousand ohms at 17 so that a relatively inexpensive voltmeter may be connected across 17 or a relatively high current meter in series therewith, as indicated at 14, for indicating changes in the cathode potential. The operation of the arrangement shown in Figure 3, still assuming slider 18 to be connected to ground and a plate battery connected between ground and anode of tube 15, is as follows:

Prior to the application of high voltage at the point marked +, there is a normal reading of current at 14. When the high voltage is applied, the resulting voltage across R is applied to the grid of tube 15 and this in turn causes a substantially equal change in the potential of the cathode of tube 15 and hence a change in the reading of instrument 14. Thus, a relatively inexpensive instrument 14 may be calibrated to read directly the high voltage applied at the point marked +.

The slider 18 may be adjusted on resistance 17 in order to bring the current in 14 to a desired value in the absence of high voltage at the point marked +. This, however, does not change the operation of the system as far as the proportionality between the changes in reading on meter 14 and the changes in potential of the anode of tube 1 is concerned. Furthermore, it has been found that tube 15 will act as a rectifier in conjunction with an alternating voltage supply 19 so that a direct current plate potential source is not necessary. Condenser 20 smooths out the current through the resistance branch 17. If a further condenser 22 is connected as shown in dotted lines, the arrangement will indicate the peak value of varying voltages applied to the anode of tube 1 since this condenser will charge up to a potential substantially equal to the peak value of the voltage appearing at the cathode of tube 1. In like manner, the dotted condenser $n$ connected across R in Figure 1 causes the average potential of the cathode C to follow the positive peak value of variation of the potential impressed on A so that an instrument adapted to indicate the direct current voltage across R will indicate peak values of the voltage to be measured. Auxiliary winding 21 of transformer 19 is provided for energizing the heaters of the tubes.

For the purpose of reducing the high voltage to be measured to a relatively low value, a tube of high amplification constant is desirable and in particular a tube having wide spacing between its anode and other tube elements so as to permit the application of the high voltage to the anode without danger of flashing over.

Also in an arrangement such as that shown in Figure 1 or Figure 3, it is desirable to keep the amplification M of the valve 1 constant both when the valve is replaced by another and from one part of the valve characteristic to another. For this reason the control grid of valve 1 should be of close mesh and arranged at a considerable distance from the cathode. Also the field at the grid and cathode due to the anode must be small, and not dependent critically on the dimensions of the tube. Uncontrolled emission and leakage from anode to cathode must be absent.

Figure 2:
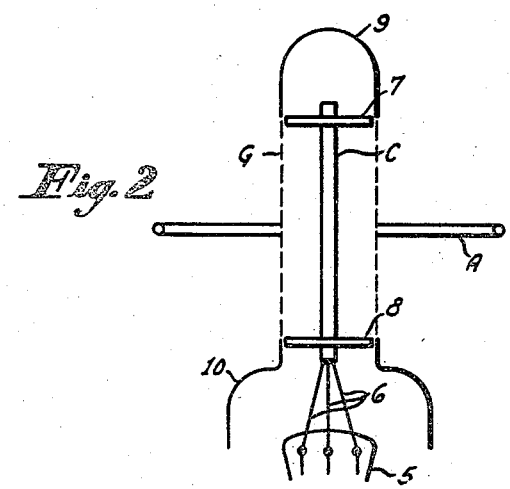
Figure 2 shows a preferred construction for the tube indicated in Figure 1.

One preferred form of tube design to meet these requirements is shown in Figure 2 of the accompanying drawing.

In Figure 2, as in Figure 1, the reference letters C, G, and A represent respectively the cathode, control electrode and anode of a valve. The cathode C is of the indirectly heated type and is in the form of a cylindrical shell having within it a heater element, the whole being supported on press 5 of the valve by means of supporting and lead-in wires 6, three in number, two of which are traversed by the heater current and the third providing the connection between the cathode and the circuit in which the valve operates. The grid G is arranged co-axially about the cathode, being spaced therefrom by insulating spacers such as 7 and 8, and has two bell-like or dome shaped shields 9 and 10 one at each end, shield 9 constituting a cap and part 10 forming a skirt. These shields 9 and 10 prevent the formation of leaky films on the insulators when the valve is "gettered" and also uncontrolled emission from the cathode, and are preferably, though not necessarily, electrically connected with the grid G. The anode A consists of a ring of thin wire, which is preferably broken at least at one point so as to prevent its destruction by eddy current heating when the valve is gettered. The anode A may be held in position by a plurality of, for example, three springs attached to the glass bulb, these springs not being shown in the drawing. One of the support springs may serve as a lead-in wire to the anode, being provided with a terminal appropriate to the voltage to be measured.

It will be seen that in the arrangement of Figure 2 by making the anode A of fine wire, the field strength at the grid due to the anode is made small. Furthermore, if the diameter of the anode is more than three or four times that of the grid, the value of the amplification factor M will not depend greatly on the accuracy with which the anode is positioned.

In a further suitable construction of valve, the grid is constructed in a longitudinal slot in a cylinder. The cathode and the shields connected to the grid, are placed outside the cylinder, the anode being arranged as a thin rod along the axis of the cylinder. In this construction also, the field at the grid due to the anode is small and is not dependent on the precise positioning of the anode.

We claim:

1. In a thermionic valve circuit arrangement, a thermionic valve having a cathode, an anode, and a control electrode associated with shielding means for preventing the cathode and the cathode lead having a large capacity to the anode, said tube having a predetermined dynamic impedance, said tube having a predetermined internal resistance, a resistance element which is high as compared to the internal resistance of the tube, said resistance element being connected between said cathode and a point at a fixed potential, and means for maintaining said control electrode at a steady potential with respect to said fixed potential, the arrangement being such that when said cathode is connected to said point and said control electrode is maintained at said potential and such a high positive potential is applied to the anode of said valve that an appreciable anode current flows, the end of said high resistance adjacent the cathode acquires a potential relative to said fixed potential which is substantially a fixed fraction of the potential applied to said anode.

2. In combination with a thermionic tube having an anode, a cathode and a control electrode, a high resistance connected between said cathode and ground, a second thermionic tube having an anode, a cathode and a control electrode, means for connecting said last named control electrode to said first named cathode, means including a second high resistance for connecting the cathode of said second tube to ground, a condenser shunted across said second high resistance, a source of anode potential connected between the anode and cathode of said second tube, the arrangement being such that potential variations on the control electrode of said second tube are substantially reproduced on the cathode thereof, a current measuring instrument arranged substantially in series with said second high resistance in such manner as to be capable of giving an indication of the potential of the cathode of said second tube, and a connection between the control electrode of the first tube and ground for maintaining said control electrode at substantially ground potential.

3. In an arrangement for producing a voltage which is substantially a fixed fraction of a voltage to be measured, a thermionic tube provided with an anode, a cathode and a control electrode, said tube having a predetermined internal resistance, resistance means the value of which is high as compared to the internal resistance of the tube, connected between the cathode and a point of fixed potential, means for maintaining said control electrode at a potential which is steady with respect to said fixed potential and in the vicinity thereof, means for applying said voltage to be measured between the anode of said tube and said point of fixed potential in such polarity as to cause an appreciable flow of anode current through the tube, the value of said resistance being sufficiently high so that the end thereof adjacent the cathode acquires a potential relative to said fixed point which is substantially a fixed fraction of said voltage to be measured.

4. In combination with a thermionic tube having an anode, a cathode and a control electrode, said tube having a predetermined internal resistance, a resistance whose value is high as compared to the internal resistance of the tube, said resistance being connected between the cathode of the tube and a point of fixed potential, a connection having substantially zero impedance between the control electrode and said point of fixed potential, means for applying substantially high positive potentials to said anode with respect to said point of fixed potential, said resistance being sufficiently greater than the internal resistance of the tube so that with potentials applied to said anode of sufficient magnitude to cause an appreciable flow of anode current, the end of said resistance adjacent the cathode acquires a potential relative to said fixed potential which is substantially a reduced image of the potentials applied between the anode and the point of fixed potential.

5. In an arrangement for measuring large potential differences, a thermionic tube having an anode, a cathode and a control electrode, said tube having a predetermined value of internal resistance and comparatively wide spacing between its anode and its other elements whereby high voltages may be applied to the anode without danger of flashing over, a resistance connected between the cathode of the tube and a point of fixed potential, said resistance being large as compared to the internal resistance of the tube, means having substantially zero impedance for connecting the control electrode to the point of fixed potential whereby the tube presents a low effective cathode impedance, means for applying the potential to be measured between the anode and the point of fixed potential, said resistance being sufficiently large as compared to the internal resistance of the tube so that upon application of the voltage to be measured as aforesaid, the end of the resistance adjacent the cathode acquires a potential relative to the fixed potential which is substantially a fixed fraction of the voltage applied to the anode, and means for measuring said fractional voltage.

6. In a high impedance voltage divider device which is adapted to develop across one portion thereof a voltage which is a substantially fixed fraction of the total voltage applied across said device, an electron discharge tube including an anode, a cathode, and a grid electrode, a resistance element, said resistance element being connected in series with the space path of the tube across the voltage to be divided with one end of the resistance connected to the cathode of the tube, a connection between the other end of the resistance and the grid electrode of the tube, the value of said resistance being large compared with the internal resistance of the tube whereby the voltage developed across said resistance is a fraction of the voltage to be measured which fraction is substantially independent of variations in the internal tube resistance, and means for indicating the voltage across said resistance.

7. The arrangement described in the next preceding claim wherein the last named means comprises a second tube having an anode, a cathode, and a grid electrode, said last named grid electrode and cathode being connected so as to be energized by the drop across said resistance element, and a second resistance connected to the cathode of the second tube and in the path of said energization and means for indicating the drop across said second resistance.

8. In a high impedance voltage divider device, a first tube having an anode, a cathode, and a grid electrode, a second tube having an anode, a cathode, and a grid electrode, means for connecting a voltage to be divided between the anode of the first tube and a point of fixed potential, means for connecting the grid electrode of the first tube to said point of fixed potential, a conductor connected between the cathode of the first tube and the grid of the second tube, a connection between the cathode of the second tube and said point of fixed potential, said connection including a series high resistance element, a second high resistance element connected between the cathode of the first tube and a point of said first named high resistance element, a condenser connected between the cathode of the second tube and the point of fixed potential, a source of anode potential for said second tube connected between the anode thereof and the point of fixed potential and means for indicating the drop across said first named high resistance element, the value of said second named resistance element being large as compared with the internal resistance of the first named tube whereby the voltage developed across said resistance is a fraction of the voltage to be divided, which fraction is substantially independent of variations in the internal resistance of said first named tube.

CABOT SEATON BULL.
ALAN DOWER BLUMLEIN.